United States Patent [19]

Salem

[11] 4,296,312

[45] Oct. 20, 1981

[54] ELECTRONIC TEMPERATURE SENSING SYSTEM FOR TOASTER APPLIANCES

[75] Inventor: Robert J. Salem, Danbury, Conn.

[73] Assignee: General Electric Company, New York, N.Y.

[21] Appl. No.: 95,867

[22] Filed: Nov. 19, 1979

Related U.S. Application Data

[63] Continuation of Ser. No. 802,422, Jun. 1, 1979, abandoned.

[51] Int. Cl.³ .............................................. H05B 1/02
[52] U.S. Cl. ................................. 219/501; 219/497; 219/505; 219/494; 99/329 R; 307/252 UA
[58] Field of Search ............... 219/501, 505, 494, 492, 219/497, 507, 490, 508, 499, 518; 99/329 R, 331; 323/2; 307/117, 252 UA

[56] References Cited

U.S. PATENT DOCUMENTS

| | | | |
|---|---|---|---|
| 3,413,446 | 11/1968 | Rogers | 219/413 |
| 3,431,400 | 3/1969 | Iida et al. | 219/501 |
| 3,472,153 | 10/1969 | Arntz | 99/329 R |
| 3,526,272 | 9/1970 | Watts et al. | 219/497 |
| 3,594,546 | 7/1971 | Smillie | 219/364 |
| 3,649,905 | 3/1972 | Krupka | 219/497 |
| 3,678,247 | 7/1972 | Sawa et al. | 219/501 |
| 3,679,518 | 7/1972 | Andler et al. | 219/497 |
| 3,956,978 | 5/1976 | Borley | 99/329 R |
| 4,112,589 | 9/1978 | Palfrey et al. | 219/497 |

FOREIGN PATENT DOCUMENTS 1176832  1/1970  United Kingdom ............... 219/497

*Primary Examiner*—Arthur T. Grimley
*Assistant Examiner*—Mark H. Paschall
*Attorney, Agent, or Firm*—Carlos Nieves; George R. Powers; Joseph B. Forman

[57] ABSTRACT

An electronic temperature sensing system for toaster appliances and the like which is capable of providing a consistent toast color independent of toast compartment temperature at the initiation of each toasting operation, the condition of the bread to be toasted and bread loading. The system includes principally a temperature sensing device having a varying resistance versus temperature characteristic that is placed in close thermal coupling with the bread to be toasted for developing a voltage Vs as a function of temperature, and integrating means for deriving a voltage Vu that is an integrated function of the voltage Vs and represents a varying reference temperature. The difference between Vs and Vu is obtained and compared to a given voltage corresponding to a given toast color for generating a signal that terminates the toasting operation upon said given toast color being reached.

31 Claims, 4 Drawing Figures

ELECTRONIC TEMPERATURE SENSING SYSTEM FOR TOASTER APPLIANCES

This is a continuation of application Ser. No. 802,422 now abandoned, filed June 1, 1979.

BACKGROUND OF THE INVENTION

The invention pertains to temperature sensing electrical circuits and devices for use with automatic toaster appliances and the like. A great number of different temperature sensing and timing schemes have been developed for providing an automatic toasting operation. Of these, there are only a few which combine an economical construction with a reasonably satisfactory operation, and none that are known to combine these characteristics in a truly optimum manner.

The simplest timing mechanism is one that works entirely on a timing principle wherein the toast cycle is tied to a pre-set time interval that may be adjusted for different toast colors. Such mechanism will perform in a consistent fashion to provide a given toast color when all starting conditions are the same, such as toast compartment temperature, bread loading and bread condition. If any one condition is different, results may be different. For example, for the same toast color setting and bread condition, a second toasting operation begun before the toast compartment cools down will result in a darker piece of toast than in the initial operation because of the different initial toast compartment temperatures. Correspondingly, at this toast color setting a frozen slice of bread will be much lighter or perhaps not toasted at all. This is because the applied heat is used primarily to bring the temperature to ambient and remove moisture from the bread.

Perhaps the most commonly employed sensing mechanism used today is a bimetallic timer and switch, the sensor element of which is a bimetallic strip having its own heater wire in association with it. The bimetal strip is remotely located from the bread so as to respond principally to the heater wire and to the ambient. At the initiation of a toasting cycle the heater is turned on to heat the bimetal strip to a peak temperature set in accordance with a desired toast color, whereupon the heater is turned off and the bimetal strip cools to a second temperature which causes a switch to operate and end the toasting cycle. This form of mechanism acts to compensate for different toaster compartment initial temperatures and therefore consistent results may be produced for successive toasting operations. However, the bimetallic timer will not compensate for variations in bread loading or bread condition. Thus, with the operation set for a given toast color setting, two slices of bread will tend to toast to a lighter color than for a single slice of bread, and three slices will tend to toast lighter still. Similarly, if the setting is proper for dry bread, moist bread will toast to a relatively light color.

A third mechanism employed in contemporary toaster appliances is a bimetallic thermal sensor and switch which includes a bimetallic strip sensor element placed in proximity with the bread for sensing the temperature of the bread and moving a lever arm to actuate the switch. Upon reaching a pre-set temperature that corresponds to a desired toast color, the bimetallic strip actuates its switch for ending the toasting cycle. The mechanism includes compensating means, which can be a separate bimetallic strip or an integral part of the primary bimetallic strip, to compensate for the spurious effects of ambient heating. Although this form of mechanism is capable of providing a uniform toast color under all starting conditions, because of the very exacting mechanical tolerances required in the construction and assembly of the mechanism, including an accurate spacing between the lever arm and the switch contacts and between the bimetallic strip and the bread surface, and the need to maintain these dimensions during continued use, it is difficult to avoid inaccuracies in the toasting operation.

SUMMARY OF THE INVENTION

It is accordingly an object of the invention to provide a novel temperature sensing system for toaster appliances and the like that operates to give consistent toasting results independent of the initial toast compartment temperature, the condition of the bread to be toasted and bread loading.

It is a further object of the invention to provide a novel temperature sensing system as above described that may be readily and inexpensively constructed.

Another object of the invention is to provide a novel temperature sensing system as above described that can be readily implemented in an electronic circuit and is therefore entirely free of moving mechanical parts.

Yet another object of the invention is to provide a novel temperature sensing system as above described in which the temperature sensor device can be placed in direct contact with the bread.

These and other objects are accomplished in accordance with one aspect of the invention by an electronic temperature sensing system used with toaster appliances and the like that provide heat by means of radiation heating which includes first means for sensing the heat applied to bread or other food article to be toasted and developing a voltage Vs that is a function of the temperature thereof, second means for developing a varying reference voltage Vu that is a function of the ambient temperature within the vicinity of the bread or other food article and thereby represents a varying reference temperature, third means for developing a voltage Vd that is a function of the difference between the temperature of the bread and the ambient temperature and which represents the heat added to the bread due to radiation, and fourth means for comparing the voltage Vd with a set voltage Vc that corresponds to a given toast color for generating a control signal for terminating the toasting operation.

In accordance with a more specific aspect of the invention, the electronic temperature sensing system includes a temperature sensor device exhibiting a varying electrical resistance versus temperature characteristic that is located so as to be in close thermal coupling relationship with the bread to be toasted, a first circuit for generating the voltage Vs as a function of the temperature of said device, integrating circuit means for generating the voltage Vu as a function of the integral of Vs, a difference circuit for taking the algebraic difference between Vs and Vu and thereby generating the voltage Vd, a potentiometer circuit for generating the voltage Vc which is invariant with respect to a given toast color but adjustable over a range of values for selecting one of several toast colors, and a comparator circuit for comparing the voltages Vd and Vc and thereby generating the control signal for terminating the toasting operation.

In accordance with yet a more specific aspect of the invention, the temperature sensor device is mounted so as to be in contact with the bread and thereby most closely represent the bread temperature, and the integrating circuit means includes resistor and capacitor components exhibiting an RC time constant corresponding to the thermal time constant of the toaster compartment, and further includes a resistor voltage divider network for generating the voltage Vu as a fraction of the total integrated voltage so as to correspond to that part of the ambient temperature which is due to radiation heating.

BRIEF DESCRIPTION OF THE DRAWING

While the specification concludes with the claims which particularly point out and distinctly define that subject matter which is regarded as the invention, it is believed the invention will be more clearly understood when considering the following detailed description and the accompanying figures of the drawing in which:

DESCRIPTION OF THE PREFERRED EMBODIMENT

Figure 1:
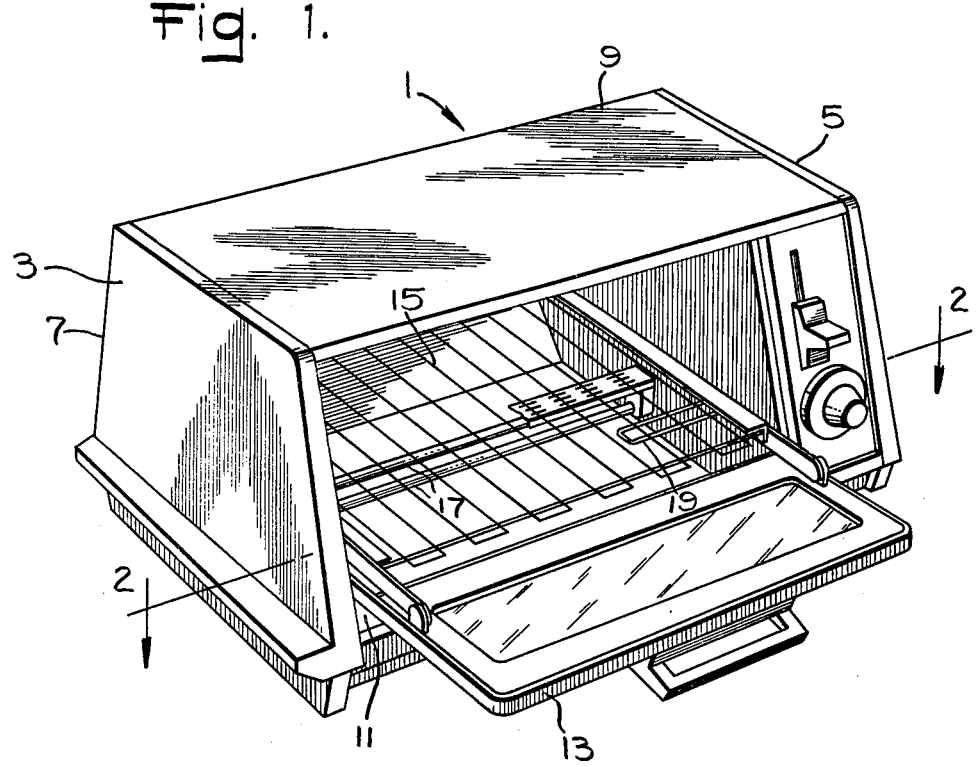
FIG. 1 is a perspective view of a toaster appliance which employs the electronic temperature sensing system of the present invention.

With reference to FIG. 1, there is illustrated a perspective view of a toaster appliance 1 which incorporates the electronic temperature sensing system of the present invention. The toaster 1 is a toaster oven type of appliance having a single compartment providing the versatility of bake and broil operations in addition to being able to toast from one to several slices of bread. The present temperature sensing system applies only to a toasting operation. While the specific toaster oven appliance illustrated is presented principally for purposes of completing the disclosure of the invention, it should be appreciated that the present temperature sensing system has application to single compartment toaster ovens of various constructions as well as to conventional pop-up toasters.

The toaster appliance 1 is shown to include left and right side walls 3 and 5, respectively, a back wall 7, top and bottom surfaces 9 and 11 and a swing out door 13, shown in the open position. Rack support wires 15 support the food article to be heated. In a toasting operation, one or more slices of bread are placed horizontally on the rack support wires. Heating is performed by parallel disposed cal rod heaters 17, of which there are two lower rods in the bottom region of the compartment and two upper rods in the top region of the compartment, the latter not appearing in the drawing.

Figure 2:
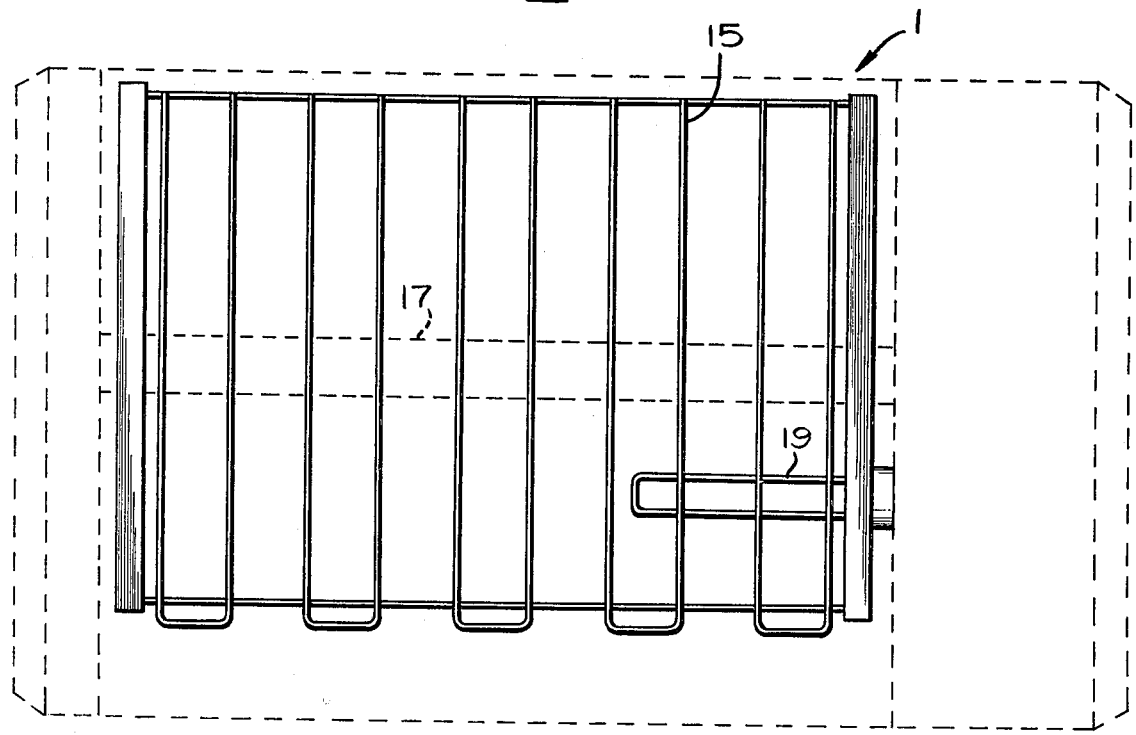
FIG. 2 is a cross sectional view, partially in dotted outline, of the toaster appliance in FIG. 1 taken along the line 2—2.

The temperature sensor device 19 of the present system is fastened to the underside of the rack support wires 15, as more clearly shown in the cross-sectional view of FIG. 2. In the exemplary embodiment of the invention being considered, the temperature sensor 19 has a positive temperature coefficient. Preferably, its resistance versus temperature characteristic is substantially linear over the range of temperature in which it is operated. The illustrated sensor device is of a wire construction having a U shape. It has dimensions of approximately one half inch separating the legs of the U by three and one half inches in length so as to provide good thermal coupling to a single slice of bread placed over it. The illustrated sensor device is more completely described in a copending Application for U.S. Letters Patent of Paul V. Snyder entitled "Electrical Temperature Sensing Device", filed concurrently with and assigned to the assignee of the present application. In the example under consideration, the toaster appliance 1 is of a size to accommodate a maximum of four bread slices at one time, each occupying approximately one quarter area of the support rack. The sensor 19 is centrally positioned in one of these areas, specifically in the right, front quarter of the support rack of the present construction, as best shown in FIG. 2. Although the illustrated sensor has advantage in providing good thermal coupling to the bread, other types and configurations of temperature sensor devices can be employed for use in the present temperature sensing system, such as a conventional point sensor. In addition, the sensor can be of a type having a negative temperature coefficient as well as a positive temperature coefficient. The principal characteristics required of the sensor are that it exhibit a varying resistance versus temperature characteristic with a relatively high temperature coefficient, and that it provide relatively good thermal coupling to the bread.

Figure 3:
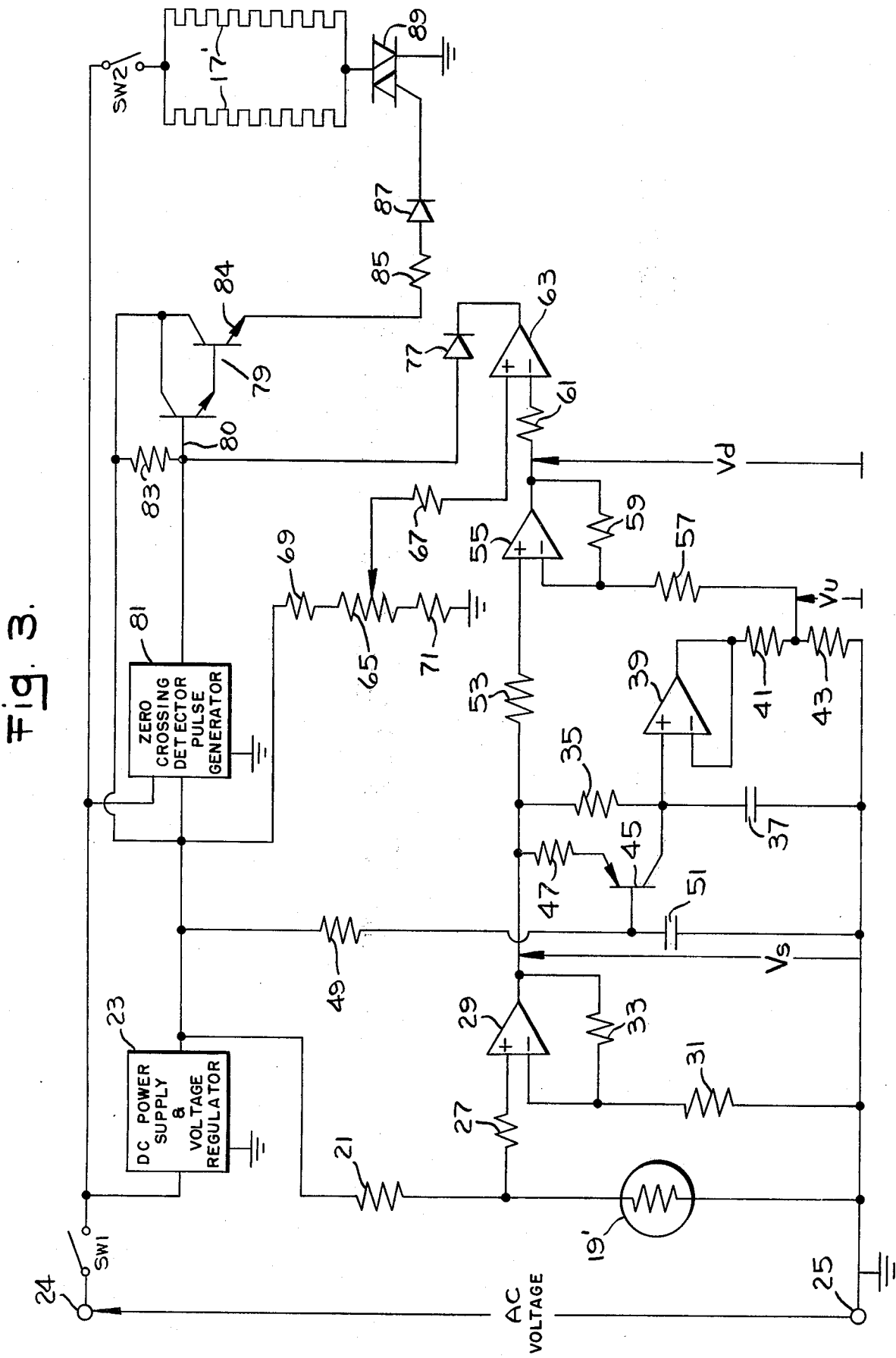
FIG. 3 is a schematic circuit diagram of the temperature sensing system of the present invention.

In FIG. 3 is illustrated a schematic circuit diagram of the inventive temperature sensing system. The system is of an all electronic type and, as will be described in detail, provides an automatic toasting operation in which completely consistent results may be achieved independent of the toaster compartment temperature at the initiation of each toasting operation, the condition of the bread to be toasted (principally moisture content of the bread) and the bread loading (the number of slices to be toasted at one time).

The temperature sensor 19', corresponding to the sensor 19 in FIG. 1, has one side connected through a voltage divider resistor 21 to the output of a DC power supply and voltage regulator circuit 23 which is a conventional circuit having its input connected through an on-off switch SW1 to the AC power line at terminal 24. Power supply 23 provides a well regulated DC voltage, normally accurate to within 5%. The other side of sensor 19' is connected to a grounded terminal 25. The junction of the sensor 19' and resistor 21 is connected through an input resistor 27 to the positive input terminal of an operational amplifier 29. The negative input terminal of amplifier 29 is connected through a resistor 31 to ground and through a further resistor 33 to its output terminal so as to provide a gain of approximately four. Operational amplifier 29, and the other operational amplifiers in the circuit, are entirely conventional components. As previously indicated, the sensor 19' exhibits a positive temperature coefficient so that a voltage is generated across it as a function of the sensor's temperature, the voltage being a substantially linear function of temperature over the present range of operating temperatures. This voltage is amplified to appear as voltage Vs at the output of operational amplifier 29.

The output of amplifier 29 is connected to an integrating network comprising a resistor 35 and a capacitor 37, a second operational amplifier 39, and a voltage divider network including resistors 41 and 43. The integrating network functions to integrate the voltage Vs with an RC time constant that is approximately equal to the thermal time constant of the toaster compartment, which integral is coupled to the voltage divider network so as to generate a voltage Vu that is a predetermined fraction of the integrated voltage corresponding to the impact of radiation heating on the integral, as will be further described. One side of the resistor 35 is connected to the output terminal of amplifier 29 and the other side is connected through serially coupled capacitor 37 to ground. The junction of resistor 35 and capacitor 37 is connected to the positive input terminal of operational amplifier 39, the negative input terminal of which is connected directly to its output terminal. The output terminal of operational amplifier 39 is further connected to one side of resistor 41, the other side of which is connected through serially coupled resistor 43 to ground. The voltage Vu appears at the junction of resistors 41 and 43. Operational amplifier 39 supplies unity gain and is placed in the circuit primarily for the purpose of impedance matching.

Considering once again the output of operational amplifier 29, it is also coupled to a PNP transistor 45 for providing a rapid charge to capacitor 37 when power is first applied to the circuit by operation of the switch SW1. Thus, the output terminal of amplifier 29 is connected through a current limiting resistor 47 to the emitter of transistor 45, the collector of which is connected to the junction of resistor 35 and capacitor 37. The serial combination of a resistor 49 and a capacitor 51 is connected across the output of power supply circuit 23 and ground, the resistor 49 being connected to the power supply output and the capacitor 51 being connected to ground. The junction of resistor 49 and capacitor 51 is connected to the base of transistor 45 for causing the transistor to momentarily conduct when the power first comes on and to remain non-conducting thereafter.

The output of operational amplifier 29 is further coupled through a resistor 53 to the positive input terminal of a third operational amplifier 55. The junction of resistors 41 and 43 is connected through a resistor 57 to the negative input terminal of operational amplifier 55. A resistor 59 serves to couple the negative input terminal of amplifier 55 to its output terminal. Operational amplifier 55 provides a voltage Vd at its output terminal that is the algebraic difference of the voltages Vs and Vu applied to the amplifier's positive and negative input terminals, respectively, while providing a gain of about one and a half.

The output of amplifier 55 is connected through a resistor 61 to the negative terminal of a comparator network 63. The tap on a potentiometer 65 is connected through a resistor 67 to the positive input terminal of comparator 63. The tap on the potentiometer 65 provides a constant voltage which corresponds to a given toast color and is manually adjustable over a range of values for providing selection of one of several toast colors. The voltage across potentiometer 65 is supplied by the output of power supply circuit 23 which is connected through a fixed resistor 69 to one side of the potentiometer, the other side being connected through a fixed resistor 71 to ground for limiting the range of voltages that are subject to selection.

The comparator 63 functions to provide a first output signal when the voltage applied to its positive terminal exceeds the voltage applied to its negative terminal, and to provide a second output signal when these voltages are reversed, i.e., the voltage applied to its negative terminal exceeds the voltage applied to its positive terminal.

The output of the comparator is connected through a diode 77 to a control circuit for controlling the supply of power to the cal rod heaters 17', which correspond to the cal rod heaters 17 referred to in FIG. 1. The control circuit includes a pair of NPN transistors 79 connected in a Darlington configuration. The base input electrode 80 of the transistor pair 79 is connected to the output of a conventional zero crossing detector pulse generator circuit 81, shown in block form. Pulse generator circuit 81 is supplied with DC voltage from power supply circuit 23 and in response to application of the AC supply voltage coupled from terminal 24 generates a pulse at each zero crossing of said AC voltage. The base input electrode of the transistor pair 79 is also connected to the anode of diode 77 and through a bias resistor 83 to the output of power supply circuit 23, which output is also connected to the joined collector electrodes of the transistor pair. The emitter output electrode 84 of the transistor pair is connected through a resistor 85 and a diode 87, poled in the forward direction, to the gate electrode of a triac device 89 which connects one end of cal rod heaters 17' to ground. The other end of the cal rod heaters are connected through a switch SW2 and through switch SW1 to the AC voltage source. Switch SW2 is actuated, such as through closing of the toaster door, to initiate a toasting operation. The pulses from pulse generator circuit 81 are applied to the base input electrode of the transistor pair 79 together with the output of the comparator 63 for causing a pulsed conduction of the transistor pair when the first output signal is supplied by the comparator. This in turn causes triac 89 to conduct for energizing the cal rod heaters 17'. When the second output signal is supplied by comparator 63, the transistor pair 79 is prevented from conducting, resulting in the cal rod heaters being de-energized.

In accordance with one exemplary embodiment of applicant's invention as described with respect to FIG. 3, the following component type and component values may be employed, which are given by way of example and are not to be construed as limiting of the invention.

| Amplifiers | |
|---|---|
| 29, 39, 55, 63 | LM324 Operational Amplifier |
| Transistors | |
| 45 | 2N3012 |
| 79 | 2N5210 |
| Diodes | |
| 77, 87 | 1N914 |
| Capacitors | |
| 37 | 22 uf tantalum |
| 51 | 50 uf electrolytic |
| Resistors | |
| 21 | 2.7K ohms |
| 27 | 10K ohms |
| 31 | 10K ohms |
| 33 | 40K ohms |
| 35 | 1.5M ohms |
| 41 | 55K ohms |
| 43 | 59K ohms |
| 47 | 2K ohms |
| 49 | 200K ohms |
| 53 | 10K ohms |
| 57 | 100K ohms |
| 59 | 50K ohms |
| 61 | 10K ohms |
| potentiometer 65 | 50K ohms |
| 67 | 10K ohms |
| 69 | 100K ohms |

| | |
|---|---|
| 71 | 20K ohms |
| 83 | 27K ohms |
| 85 | 90 ohms |
| Temperature Sensor | |
| 19' | 250 ohms at 68° F. to 650 ohms at 600° F. |
| Triac | |
| 89 | 16 Amps 200V. TI Type TIC236 |
| AC voltage | 100v, 60Hz |
| Regulated DC voltage | 6v |

Considering now the operation of the temperature sensing system of FIG. 3, the on-off switch SW1 is closed to supply power to the circuit. For the purpose of explanation, it will be assumed that the toaster appliance and bread to be toasted are at room temperature prior to initiation of the first toasting operation. Thus, the temperature sensor 19' is at room temperature and its resistance value and the voltage across it are a function of this temperature. The sensor voltage is amplified by operational amplifier 29 to provide the voltage Vs at its output. A plot of Vs expressed in volts, and the corresponding sensor temperature Ts expressed in degrees Fahrenheit, versus time expressed in seconds is illustrated by the curve A in FIG. 4, covering two successive toaster operations. Upon closing of the switch SW1, the transistor 45 is caused to momentarily conduct and charge the capacitor 37 to substantially the full voltage appearing at the output of amplifier 29. The transistor is turned off by the voltage developed across capacitor 51 and remains off for so long as the power is on. Subsequently, capacitor 37 is charged and discharged through resistor 35, the principal discharge path being through amplifier 29 to ground. The voltage across capacitor 37 is coupled through amplifier 39 to the resistor divider network of resistors 41 and 43 to appear as the voltage Vu across resistor 43. In the exemplary embodiment of the invention under consideration, the RC time constant of resistor 35 and capacitor 37 is in the range of 20 to 25 seconds and typically 22 seconds, and resistors 41 and 43 are assigned values that result in Vu representing in the range of 50 to 55%, and typically 52%, of the voltage appearing at the output of amplifier 39. The reason for utilizing the noted time constant and this voltage fraction will be explained presently. A plot of Vu, which is a varying reference voltage, versus time is illustrated by the curve B in FIG. 4.

As will be more fully described, applying power to the circuit through closure of switch SW1 results in turning on the triac 89. Thus, upon closing the switch SW2 to initiate a toasting operation, current is supplied to the cal rod heaters 17' from AC voltage source which causes them to rapidly heat, as shown by the curve C in FIG. 4. This in turn causes the temperature of the sensor 19' to increase with time. Since the sensor's resistance is a substantially linear function of temperature over the range of operation, the voltage Vs will correspondingly increase with time, as shown by curve A. While the voltage Vs applied to the positive input terminal of difference amplifier 55 increases, the voltage Vu applied to the negative input terminal of amplifier 55 increases as a fraction of the integral of Vs in accordance with the following expression:

$$Vu = k/RC \int Vs \, dt \qquad (1)$$

where k equals the ratio of the resistance of resistor 43 to the sum of the resistances of resistors 41 and 43, R is the resistance of resistor 35 and C is the capacitance of capacitor 37. The increase in Vu is shown by curve B. A voltage Vd is generated at the output of difference amplifier 55 that is a function of the algebraic difference between voltages Vs and Vu. Since the value of Vs changes more rapidly than the value of Vu, as Vs increases the difference voltage Vd will increase. The manner in which Vd changes can be seen from an examination of curves A and B.

The magnitude of the voltage Vd is compared to the magnitude of a voltage Vc in the comparator 63. The voltage Vc is a constant voltage obtained from an adjustable tap on potentiometer 65 that corresponds to a selected toast color, the greater the magnitude of Vc the darker the toast color. During the initial heating stages, Vd is less than Vc and the comparator functions to generate a first digital signal. In the circuit under consideration this first signal is a sufficiently positive signal that prevents diode 77 from conducting in the presence of signal pulses supplied by the pulse generator circuit 81 so that these signal pulses cause the transistor pair 79 to conduct. Conduction of these transistors supply trigger signals to triac 89 which keep it intermittently on to maintain an energized condition of the cal rod heaters 17'. At the instant voltage Vd exceeds voltage Vc the output state of the comparator 63 abruptly changes to a second digital signal which is a negative signal that causes diode 77 to conduct. Thus, the signal pulses from circuit 81 are effectively shunted through diode 77 and the transistor pair 79 cannot conduct. In turn, no trigger signals are supplied to triac 89 and it remains in an off condition so as to de-energize the cal rod heaters, which ends the toasting operation. At this time the switch SW2 is normally opened and the toast removed.

As the temperature sensor 19' cools, the voltage Vs decreases but the voltage Vu, since it is delayed with respect to Vs and slow to change direction, will continue to increase for some additional time and then gradually decrease. Thus, the magnitude of the voltage Vd rapidly falls below that of the voltage Vc and the output of comparator 63 changes to the first digital signal, which results in the triac 89 being triggered to its on condition. When the next toasting operation is commenced by closing the switch SW2, the cal rods 17' immediately begin heating and the process previously described is repeated. Thus, as the sensor 19' is heated the voltage Vd once more increases in magnitude until surpassing Vc and the triac 89 is again turned off, ending the second toasting operation.

Figure 4:
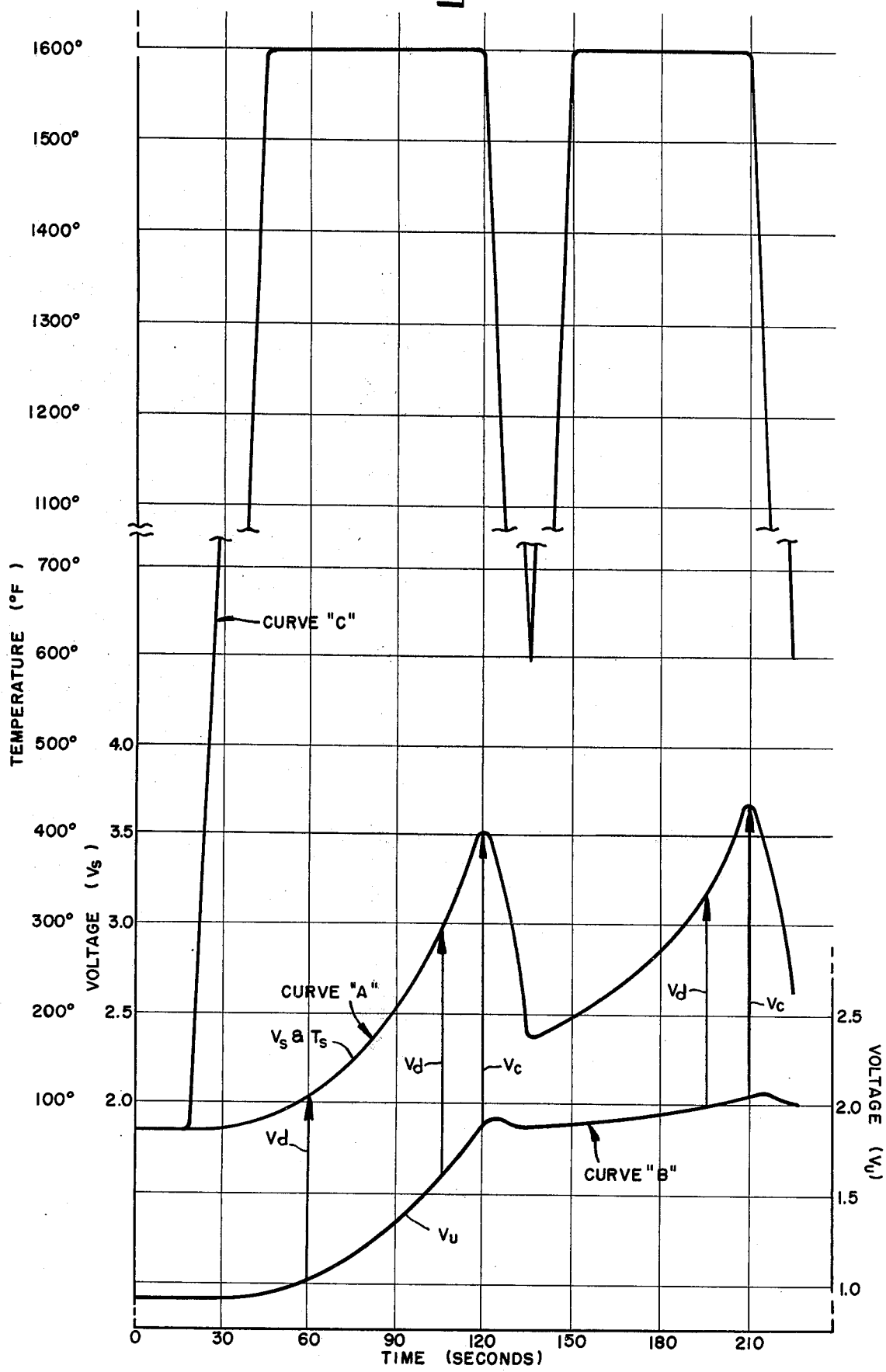
FIG. 4 illustrates a series of curves useful in explaining the operation of the system of FIG. 3.

The curves of FIG. 4 will now be referred to to explain the thermal reactions that take place during the illustrated toasting operations, which may be considered as typical. With reference to curve A it is seen that at time t=0 the temperature Ts of the sensor 19' is at the ambient temperature, giving rise to a voltage Vs slightly below two volts. As to curve B, the voltage Vu is slightly below one volt. From curve C it is seen that the cal rod heater is also at the ambient temperature at t=0.

Upon closing of the switch SW2 at t=15 seconds to initiate a toasting operation, current is supplied to the cal rod heaters 17' from the AC voltage source and, as shown by curve C, the temperature of the cal rods immediately increases. Upon reaching a temperature of about 1300° F., they begin to glow red. In the remainder of the first toaster operation the cal rods reach a maximum temperature of about 1600° F. and during this time radiate substantial amounts of thermal energy. Prior to the glow temperature being reached, heating of the temperature sensor 19' is due principally to conduction and convention. During this part of the operation there occurs but a relatively small increase in temperature of the sensor 19', and of the bread which is in close thermal coupling with the sensor and closely approximates the sensor temperature. Also during this time relatively little moisture is removed from the bread. Once the cal rods begin radiating, moisture is rapidly removed from the bread and the temperature of the sensor increases rapidly as the bread toasts.

The amount of toasting is found to be a function of the quantity of heat added to the bread due solely to radiation, Qr, once the total moisture content is removed from the bread. This quantity of heat added may be expressed as follows:

$$Qr = C\Delta tr \quad (2)$$

where C is the specific heat of the bread and $\Delta tr$ is the increase in temperature of the bread due solely to radiation. Curve A is a function of sensor temperature, and the corresponding voltage, due to the combined effects of radiation, conduction and convection heating. Curve B is a function of the integral of curve A having an RC time constant approximately equal to the thermal time constant within the toast compartment, curve B being the integral reduced by a fraction corresponding to the impact of radiation heating alone. Thus, curve B provides a varying reference voltage representing a varying reference temperature which may be considered as corresponding to that fraction of the ambient temperature within the vicinity of the sensor and bread that has resulted from radiation heating. The difference, then, between the curves A and B represents the increase in bread temperature due to radiation, $\Delta tr$, thereby providing a measure of the heat added to the bread due to radiation. By comparing this change in temperature to a given value known to correspond to a given toast color, that toast color is consistently achieved irrespective of starting conditions.

By considering curves A and B, the voltage difference between them, Vd, which represents $\Delta tr$, is seen to exceed the given value Vc at t=120 seconds. At this time the first toasting operation is terminated, switch SW2 is opened and the toast is removed. The cal rod heaters, the sensor 19' and the toast compartment begin to cool as shown by curves in FIG. 4. If it is assumed that bread is re-loaded into the toaster compartment and the switch SW2 again closed to begin the second toasting operation at t=135 seconds, heating will commence at this time. It is seen that during the brief cooling period, the integrated voltage Vu changes relatively little. Thus, its value is substantially higher at the initiation of the second toasting operation than for the first operation. It is also seen from curve C that cal rod heaters being to glow much sooner in time, about ten seconds into the heating period for the second operation. Accordingly, in the second toasting operation Vd is seen to reach the value Vc in a shorter time at about t=210 seconds, which is 75 seconds from the beginning of this operation.

It may be appreciated that numerous circuit changes and modifications can be made to the disclosed circuitry without exceeding the basic scope of the present invention. For example, a temperature sensor device of different construction than that illustrated might be employed, such as a point sensor attached or placed in close proximity to the toaster rack support wires. A negative temperature coefficient sensor such as a thermistor, could also be employed, connected in the circuit of FIG. 3 in place of the positive temperature coefficient element 19'. In such case, curves A and B of FIG. 4 would be the mirror image of their present form, the sensor voltage Vs and its integral function Vu being of maximum positive value when cold and decreasing in value as the temperature should rise. The voltage Vd would then have a negative value but the principles of operation of the circuit would otherwise be the same. Alternatively, if a negative temperature coefficient sensor were interchanged in the circuit with resistor 21, operation would be similar to that of the illustrated embodiment.

The appended claims are intended to include within their ambit these and all other modifications that fairly fall within the true scope and meaning of this invention.

What I claim as new and desire to secure by Letters Patent of the United States is:

1. A temperature sensing system for sensing the heat applied to bread or other food article when loaded within the toast compartment of a toaster appliance so as to provide a consistent toast color for a given toast color setting for each toasting operation irrespective of starting conditions, comprising:
(a) first means, including a single temperature sensor to be positioned within the toast compartment of a toaster applicance and having an electrical characteristic which varies as a function of temperature, for providing a first electrical signal that is a function of the temperature of bread or a food article loaded within said toast compartment,
(b) second means to be positioned remote from the toast compartment for providing a second electrical signal that is a function of the ambient temperature in the vicinity of the loaded bread or other food article, said second signal being a function of the integral of said first electrical signal,
(c) third means for providing a third electrical signal that is a function of the difference between said first and second signals,
(d) fourth means for providing a fourth electrical signal that is invariant with respect to a given toast color as determined by the toast color setting, and
(e) fifth means responsive to the third and fourth signals for providing a fifth electrical signal for terminating the toasting operation upon said loaded bread or other food article having reached said given toast color.

2. A temperature sensing system as in claim 1 in which said second means is coupled to the output of said first means for deriving said second signal as a time delayed function of said first signal.

3. A temperature sensing system as in claim 2 in which said fifth means includes a comparator means for comparing said third and fourth signals for providing the fifth signal as a first or second digital signal in accordance with the relative amplitudes of said third and fourth signals.

4. A temperature sensing system as in claim 3 in which said fourth means includes an adjustable resistance means the value of which may be adjusted to provide one of several toast color settings.

5. A temperature sensing system as in claim 1 in which said first means includes a temperature sensor means having an electrical characteristic that varies as a function of temperature.

6. A temperature sensing system as in claim 5 in which said temperature sensor means is located within said toast compartment so as to provide close thermal coupling with the loaded bread or other food article.

7. A temperature sensing system as in claim 6 in which said temperature sensor means is mounted within said toast compartment so as to be in physical contact with said loaded bread or other food article.

8. A temperature sensing system for sensing the heat applied to bread or other food article when loaded within the toast compartment of a toaster appliance so as to provide a consistent toast color for a given toast color setting for each toasting operation irrespective of starting conditions, comprising:
(a) first means, including a single temperature sensor to be positioned within the toast compartment of a toaster appliance and having an electrical characteristic which varies as a function of temperature, for providing a voltage Vs that is a function of the temperature of bread or a food article loaded within said toast compartment.
(b) second means to be positioned remote from the toast compartment for providing a voltage Vu that is a function of the ambient temperature in the vicinity of the loaded bread or other food article, said voltage Vu being a function of the integral of said voltage Vs,
(c) third means responsive to the voltages Vs and Vu for providing a voltage Vd that is a function of the difference between said voltages Vs and Vu,
(d) fourth means for providing a voltage Vc that is invariant with respect to a given toast color as determined by the toast color setting, and
(e) fifth means responsive to the voltages Vd and Vc for providing a control signal for terminating the toasting operation upon said loaded bread or other food article having reached said given toast color.

9. A temperature sensing system as in claim 8 in which said second means includes integrating circuit means coupled to the output of said first means for integrating the voltage Vs and generating the voltage Vu at its output as a function of the integral of voltage Vs.

10. A temperature sensing system as in claim 9 in which said integrating circuit means includes an RC integrating network the RC time constant of which is related to the thermal time constant of said toast compartment for providing a correspondence between said integral of voltage Vs and said ambient temperature.

11. A temperature sensing system as in claim 10 wherein said integrating circuit means further includes a voltage divider network to which the integral of voltage Vs is applied for generating the voltage Vu as a predetermined fraction of the integral of voltage Vs so that the voltage Vu is substantially a function of that part of the ambient temperature which is due to radiation heating.

12. A temperature sensing system as in claim 11 in which said fifth means includes a comparator network for comparing the relative amplitudes of the voltages Vd and Vc for providing a first digital control signal when Vd is less than Vc and a second digital control when Vd is greater than Vc.

13. A temperature sensing system as in claim 12 in which said fourth means includes a potentiometer that is adjustable to provide one of several values of the voltage Vc corresponding to one of several toast color settings.

14. A temperature sensing system as in claim 8 in which said first means includes a temperature sensor device having an electrical resistance characteristic that varies as a function of temperature.

15. A temperature sensing system as in claim 14 in which said temperature sensor device is located within said toast compartment so as to provide close thermal coupling with the loaded bread or other food article.

16. A temperature sensing system as in claim 15 in which said temperature sensor device is mounted within said toast compartment so as to be in physical contact with said loaded bread or other food article.

17. A temperature sensing system as in claim 11 wherein said RC time constant is in the range of 20 to 25 seconds and said predetermined fraction is in the range of 0.50 to 0.55.

18. A temperature sensing system for heat applied to bread or other food article loaded within the toast compartment of a toaster appliance so as to provide a consistent toast color for a given toast color setting for each toasting operation irrespective to starting condition, comprising:
(a) temperature sensing means, including a single temperature sensor to be positioned within the toast compartment of a toaster appliance and having an electrical characteristic which varies as a function of temperature, said temperature sensing means being located within said toast compartment in close thermal coupling relationship with bread or a food article to be toasted, said temperature sensing means having an electrical resistance characteristic that is a function of temperature, for developing a voltage Vs that is a function of the temperature of said temperature sensing means,
(b) second means to be positioned remote from the toast compartment for developing a voltage Vu as a variable reference voltage that is a function of the ambient temperature condition in the vicinity of the loaded bread or other food article, said voltage Vu being a function of the integral of said voltage Vs,
(c) third means coupled to the output of said first and second means for developing a voltage Vd that is a function of the difference between the voltages Vs and Vu,
(d) fourth means for generating a voltage Vc that is invariant with respect to a given toast color as determined by the toast color setting, and
(e) fifth means for comparing the voltages Vd and Vc and generating a control signal employed for terminating the toasting operation upon said loaded bread or other food article having reached said given toast color.

19. A temperature sensing system as in claim 18 in which heat applied to said loaded bread or other food article during a toasting operation is in the form of radiation, conduction and convection wherein said second means includes an RC integrating network coupled to the output of said first means for providing an integral of the voltage Vs, and a voltage divider network coupled to the output of said integrating network for generating the voltage Vu as a predetermined fraction of the integral of voltage Vs so that said voltage Vu is a function of that fraction of the ambient temperature which is due to radiation heating.

20. A temperature sensing system as in claim 19 wherein the RC time constant of said integrating network is related to the thermal time constant of said toast compartment.

21. A temperature sensing system as in claim 20 wherein said fifth means includes a comparator network for comparing the relative amplitude of the voltages Vd and Vc for a first digital control signal when Vd is less than Vc and generating a second digital control signal when Vd is greater than Vc.

22. A temperature sensing system as in claim 21 in which said fourth means includes a potentiometer with an adjustable tap for adjusting the magnitude of Vc so as to provide selection of one of several different toast color settings.

23. A temperature sensing system as in claim 18 wherein said temperature sensing means includes a sensor device having a positive temperature coefficient.

24. A temperature sensing system as in claim 23 in which said sensor device is mounted within said toast compartment so as to be in physical contact with said loaded bread or other food article.

25. A temperature sensing system as in claim 20 in which said RC time constant is in the range of 20 to 25 seconds and said predetermined fraction is in the range of 0.50 to 0.55.

26. A temperature sensing system for sensing the heat applied to bread or other food article when loaded within the toast compartment of a toaster appliance so as to provide a consistent toast color for a given toast color setting for each toasting operation irrespective of starting conditions, comprising:
(a) first means, including a single temperature sensor to be positioned within the toast compartment of a toaster appliance and having an electrical characteristic which varies as a function of temperature, for providing a voltage Vs as a function of temperature proximate bread or a food article,
(b) second means to be positioned remote from the toast compartment for providing a voltage Vu as a function of the integral of the voltage Vs,
(c) third means responsive to the voltages Vs and Vu for providing a voltage Vd as a function of the difference between said voltages Vs and Vu,
(d) fourth means for providing a voltage Vc representative of said toast color setting of a toasting operation,
(e) fifth means responsive to the voltages Vd and Vc for providing a control signal employed for terminating the toasting operation upon said loaded bread or other food article having reached said given toast color.

27. A temperature sensing system as in claim 26 in which said second means includes integrating circuit means coupled to the output of said first means for integrating the voltage Vs and generating the voltage Vu at its output.

28. A temperature sensing system as in claim 27 wherein said integrating circuit means includes an RC integrating network and a voltage divider network to which the integral of voltage Vs is applied for generating the voltage Vu as a predetermined fraction of the integral of voltage Vs.

29. A temperature sensing system as in claim 28 in which said fifth means includes a comparator network for comparing the relative amplitudes of the voltages Vd and Vc for providing a first digital control signal when Vd is less than Vc and a second digital control when Vd is greater than Vc.

30. A temperature sensing system as in claim 29 in which said fourth means includes a potentiometer that is adjustable to provide one of several values of the voltage Vc corresponding to one of several toast color settings.

31. A temperature sensing system as in claim 28 in which said integrating network has an RC time constant in the range of 20 to 25 seconds and said predetermined fraction is in the range of 0.50 to 0.55.

* * * * *